United States Patent [19]

Kraus

[11] Patent Number: 5,106,223
[45] Date of Patent: Apr. 21, 1992

[54] CONNECTION ASSEMBLY FOR USE BETWEEN A SUPPORT AND A PLATE ELEMENT

[75] Inventor: Willibald Kraus, Grunstadt, Fed. Rep. of Germany

[73] Assignee: TRW United-Carr GmbH Co., K.G., Enkenbach-Alsenborn, Fed. Rep. of Germany

[21] Appl. No.: 695,616

[22] Filed: May 3, 1991

[30] Foreign Application Priority Data

May 7, 1990 [DE] Fed. Rep. of Germany ....... 4014589

[51] Int. Cl.$^5$ .............................. B25G 3/00
[52] U.S. Cl. .................. 403/11; 403/407.1; 24/297; 24/573.1; 24/669
[58] Field of Search ............ 403/407.1, 405.1, 11; 24/297, 573.1, 669, 702; 411/508, 509, 510

[56] References Cited

U.S. PATENT DOCUMENTS

| 4,505,611 | 3/1985 | Nagashima | 403/405.1 X |
| 4,867,599 | 9/1989 | Sasajima | 403/405.1 |
| 5,038,444 | 8/1991 | Gordon | 24/297 X |

FOREIGN PATENT DOCUMENTS

| 2626140 | 12/1977 | Fed. Rep. of Germany . |
| 3034569 | 7/1984 | Fed. Rep. of Germany . |
| 3029845 | 5/1985 | Fed. Rep. of Germany . |
| 1499495 | 9/1967 | France . |
| 1572541 | 6/1969 | France . |
| 1036423 | 7/1966 | United Kingdom . |

Primary Examiner—Andrew V. Kundrat
Attorney, Agent, or Firm—Fay, Sharpe, Beall, Fagan, Minnich & McKee

[57] ABSTRACT

The invention is concerned with an assembly for providing a connection between a support 1, for example, a body part of a motor vehicle, and a plate element 2, for example, a wall panel of a motor vehicle. The assembly generally includes a molded plastic holding element 4 which can be releasably connected into an aperture 3 of the support 1. The holding element 4 is equipped with a head piece 5. The assembly also includes an upper part or component 6 which is attachable to the plate element 2. Between the upper part 6 and the holding element 4 is a middle piece or component 7. The middle piece 7 includes an upper area 8 which is designed so that it can be snapped into the upper part 6. A lower portion 9 of the middle piece 7 is designed for lateral insertion of the head piece 5 of the holding element 4. The relationship between the middle part 7 and the other two components of the assembly is such that significant compensation for tolerance and distance variations is provided in directions transverse and perpendicular to the plate element 2.

12 Claims, 1 Drawing Sheet

CONNECTION ASSEMBLY FOR USE BETWEEN A SUPPORT AND A PLATE ELEMENT

BACKGROUND OF THE INVENTION

The subject invention is directed to a connection assembly for use between a support element and an associated structural component such as a plate element. The invention is specifically suited for providing a connection between a structural body part of a motor vehicle and an associated wall panel.

In its broader aspects the connection assembly includes a holding element formed of plastic and provided with a head piece. The holding element is arranged so that it can be set into an aperture of the support and its head piece provides means for joining the associated structure needed for providing the connection to the plate element.

In general, a connection of this general type is known in the prior art whereby a holding element of the type that can be placed into a support aperture is initially directly connected in one piece with a part that can be attached to an associated plate element. Such an arrangement is shown, for example, in German Patent Specification 3029845. In such an arrangement, the head of the holding element is placed into an aperture of the part connected with the plate element upon completion of the connection. This type of connection is only suitable for very specific fixed distances between a structural support and a plate element. If greater tolerances and/or distances must be taken into consideration as is often required, for example, between a body part of a motor vehicle and an associated wall panel, then this known prior art device cannot readily be employed. Other connections between a support and a plate element are known from the following prior art patent specifications: German Patent 2626140, British Patent 1,036,423, French Patent 1,499,495, and French Patent 1,572,541. All of the connections shown in these prior art patents are for use between a support and a plate element but are unsuitable for use when significant tolerance variations and/or variations in the distance between the support and the plate element occur.

A device for the adjustment of a first construction piece relative to a second construction piece is also known in the state of the prior art as shown in German Patent 3304569. In this prior art arrangement, a cage is employed in which a lever stand is received. The lever stand can cooperate via gear-tooth systems with corresponding counter-gear-tooth systems in the cage. This arrangement permits adjustment in three directions via the two aforementioned construction pieces. With this known prior art construction, however, a screw element is required such that after appropriate adjustment it is possible to produce proper functioning and bracing of the individual parts vis-a-vis one another. Consequently, this prior art device has a restricted application field since there must be accessibility for manipulation of the screw element.

According to the present invention there is provided a construction and design of a connection assembly designed in a manner such that even with significant tolerance variation a solid attachment of a plate element to a support is assured in a simple fashion Moreover, the connection is simple to assemble and/or disassemble.

According to the invention, this connection advantageously includes a middle or intermediate element which is positioned between an upper part that is connected to the plate element and a holding element that is connected to the support. The middle or intermediate element includes an upper area that can be snapped into the upper piece and a lower area which is designed for lateral insertion of the head piece of the holding element. A reduced diameter neck piece of the holding element is adapted to be received in an insertion plane with plates on all sides of a pocket of the middle piece. This provides for adjustment of the connection in planes parallel to the plate element. A tube shaped section of the upper piece is adapted for providing variations in the distances between the support and the plate element. As a consequence of this relationship, there results the advantage that even with large tolerance variations, a solid fastening of a support to a plate element is assured. As is apparent, these tolerance or distance variations can exist both in the distance of the two parts from one another, as well as in a cross-plane relationships. That is, there can be variations in the relationship and relative spacing between the position of the aperture into which the holding element is received, as well as variations in its distance from the plate. In each instance, excellent tolerance variation compensation is provided.

The connection of the plate element with the support is achieved quickly and requires no special tools. Similarly, simple disassembly also results. Thus, the connection assembly according to the invention is specifically beneficially employed when attaching a wall panel to a body part of a motor vehicle.

For snapping the upper portion of the middle component into the upper part, the middle component may be provided with a spherical connecting segment. The spherical segment can be set into an aperture of the upper piece provided that such an aperture is provided with a matching counter profile. The spherical segment of the upper piece can include conically tapering cross-pieces evenly distributed about the circumference thereof. Additionally, the spherical segment may have on its undersurface formed by several similarly conically tapering cross-pieces which run parallel in the area below the spherical segment This design for the spherical segment results in a significant material savings compared to solid construction. Moreover, in the lower region of the middle piece, the apertured pocket can be provided with a springy or resilient insertion zone. This functions to allow lateral insertion of the holding element into the pocket while allowing the dimensions between a head piece of the holding element and the pocket of the middle piece to be such that a lateral displacement of the two parts relative to one another is possible Likewise, this assures in a beneficial manner, an excellent tolerance equalization.

According to a further and more limited aspect of the invention, it is possible that the insertion zone can have a conically tapering entrance region provided by bordering flange pieces of the pocket. This helps assure simplified installation when inserting the head piece of the holding element into the pocket of the middle piece. Additionally, there is less chance of separation since the insertion zone is of springy or resilient construction to grip the head piece.

In accordance with a further aspect of the invention, the upper part or component may have a holding plate or connecting surface which is connectable with the plate element. Moreover, it may include a tube-shaped section which borders the plate element and is provided with an aperture and a counter-profile for the spherical segment of the middle piece. Additionally, the aperture in the tube-shaped section may be of ribbed design and the counter profile may include a conical entry zone. It should be understood that the upper part can be connected with the holding plate by gluing, for example, or by welding with the plate element.

The above and other objections and advantages of the invention will become apparent from the following description when read in conjunction with the accompanying drawings wherein.

Figure 5:
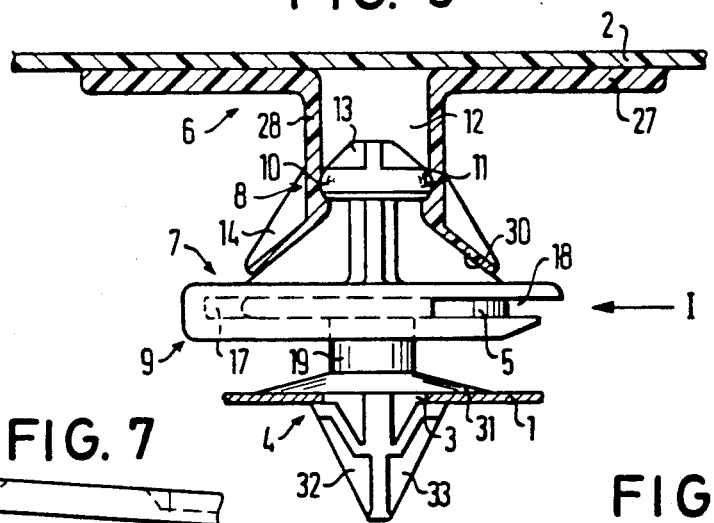
FIG. 5 is a side elevational view (partially in cross-section) of the connection assembly formed in accordance with the preferred embodiment of the invention and illustrated in its assembled condition.

Referring more particularly to the drawings wherein the showings are for purposes of illustrating the preferred and alternate embodiments of the invention only and not for the purpose of limiting same, FIG. 5 represents in side elevational view the overall connection assembly formed in accordance with the preferred embodiment of the invention and in its assembled condition to provide a connection between a support element 1, specifically a body part of a motor vehicle, and a plate element 2, specifically a wall panel of such a motor vehicle. Broadly, the overall assembly includes a holding element or component 4 and an upper part or component 6 which are interconnected by a middle piece or component 7. As illustrated, all of the components of the connecting assembly including the holding element 4 are preferably molded of plastic. Element 4 is arranged to be resiliently snapped into an aperture 3 formed in the support element 1. The details of the portion of the holding element 4 which are received in the aperture 3 will subsequently be described in greater detail. For the present, however, it is sufficient to note that many different types of snap-in connections known in the art could be used to connect the support or holding element 4 to the support element 1. It should also be noted that the holding element 4 is equipped with a head piece 5 (see FIG. 6) which is used for connecting it to the middle piece 7 in a manner to be subsequently described.

The upper part 6 is attached to the plate element 2 in any convenient manner such as by gluing or by a welding operation Between the upper piece 6 and the holding element 4 is arranged the middle piece 7. Broadly, an upper region 8 of the middle piece 7 is resiliently clipped or snapped into the upper piece 6 A lower region 9 of middle piece 7 is designed for lateral insertion receipt of the head piece 5 of the holding element 4.

Figure 1:
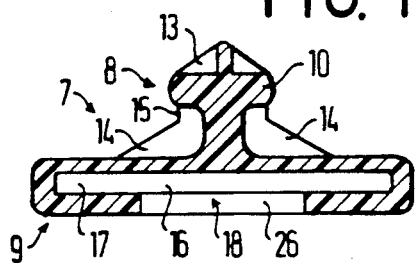
FIG. 1 is a cross-section through the middle piece; the cross section is taken on line 1—1 of FIG. 3.
Figure 3:
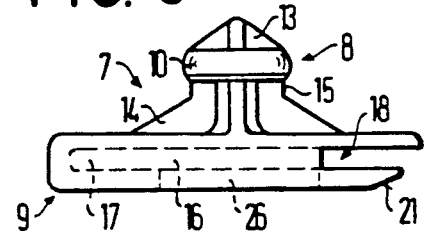
FIG. 3 is a side elevational view of the middle piece.
Figure 2:
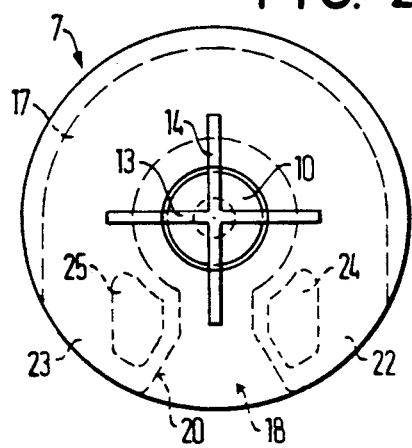
FIG. 2 is a top plan view of the middle piece.
Figure 4:
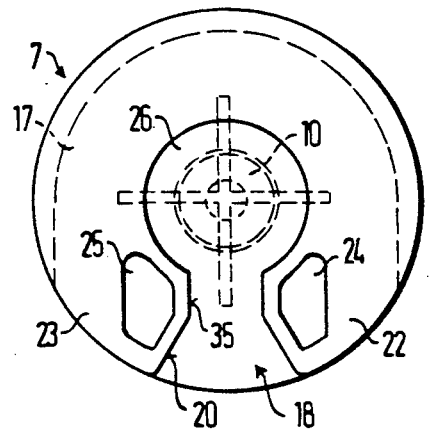
FIG. 4 is a bottom plan view of the middle piece.

The preferred form of the middle piece 7 of the connection assembly of the subject invention is illustrated in detail in FIGS. 1–4. As illustrated therein, the middle piece 7 includes in the upper region 8 a spherical segment 10 which is best shown in FIGS. 1 and 3. The spherical segment 10 has on its upper side several conically tapering cross pieces 13 which are evenly distributed about the circumference thereof In the embodiment under consideration, there are four of the cross pieces 13 which are positioned at 90° intervals. On the underside of the spherical segment 10, there are likewise arranged conically tapering cross pieces 14 which are also distributed evenly over the circumference of the head. The cross pieces 14 include a somewhat parallel rectangular shape in area 15 and transform into the conical shape as best seen in FIGS. 1 and 3. The cross pieces 13 on the upper surface and the cross pieces 14 on the underside preferably are in vertical alignment have an equal thickness as can be seen in FIGS. 2 and 4.

The lower area 9 of the middle piece 7 is constructed so as to provide a laterally open pocket portion 17 with an entrance aperture 16. Preferably, zone 18 is springy and resilient in that resilient deflection of the pocket in vertical directions can take place in this area. This relationship can best be seen in FIGS. 2–4.

The dimensioning in this arrangement is such that initially the width of the insertion zone 18 in pocket 17 is slightly smaller than the diameter of neck piece 19 of the holding element 4 which is contiguous below head piece 5 (See FIG. 6). The conical zone is followed by parallel running areas 35 whose distance from one another is smaller than the diameter of neck piece 19. This arrangement limits the likelihood of disconnection of the parts as a result of vibrations and the like. It should also be noted that the aperture 16 of pocket 17 has a width (i.e., diameter) that is significantly greater than the diameter of head piece 5 of the holding element 4. This particular relationship allows significant lateral shifting of the holding element 4 relative to the middle piece 7. Note that the holding element 4 can be moved laterally in all directions while a connection is maintained between the head 5 and the pocket 16. The resilient nature of the insertion zone 18 together with the tapering cross section of the opening limits the likelihood that unwanted separation of the components will take place.

Thus, as can be seen from the foregoing, the possibility exists, according to FIG. 5, of displacing in the direction of the arrow-to the left or to the right-the holding element 4 so that relative to the aperture 3 of support 1 there exists the ability to compensate for significant tolerance An additional tolerance compensation ability exists in that, according to FIGS. 1–4, the pocket 17 of middle piece 7 in the area behind insertion zone 18 has the recess 26 in the shape of a circular cut-out which is larger in diameter than the diameter of the holding piece 19 of the holding element.

As can be seen in FIGS. 2 and 3, the insertion zone 18 has on two planes a conically tapering entry area 20 or 21. As is apparent from FIG. 2, adjacent to entry area 20 of insertion zone 18, there are two flange parts 22 and 23. These flange parts are equipped, respectively, with recesses 24, 25. Thus, if the holding element as represented in FIG. 6 is inserted with its head piece 5 into the pocket 17 of middle piece 7, the entry region 20 can yield resiliently due to the recesses 24 and 25. This assures a simple and rapid connection between the middle piece 7 and the holding element 4. The other entry region 21 can, as seen in FIG. 3, be likewise shaped conically so that overall the installation is quick and problem-free.

Figure 6:
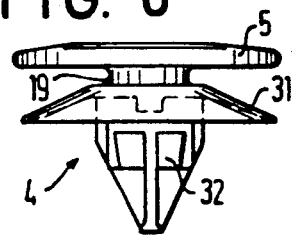
FIG. 6 is a side view of the holding element intended for insertion into the support opening; and, FIG. 7 is a side elevational view showing another possible embodiment for the upper piece.

As is apparent from FIG. 4, the pocket behind insertion zone 18 includes a recess 26 having the shape of a segment of a circle which is larger in diameter than the diameter of the neck piece 19 of the holding element 4 as represented in FIG. 6. This provides assurance that after installation, a tolerance variation can be achieved by shifting holding element 4 in middle piece 7. That is, the holding element 4 can be displaced laterally in any direction within the middle piece 7. The holding element 4 as represented in FIG. 6 and comprised of the head piece 4, a sealing lip 31 and flexible fingers 32 and 33 facing each other is known in the prior art and illustrated in German Patent 89 11 881.2, as well as U.S. Pat. Application Ser. No. 07/437,168 filed Nov. 16, 1989. Specifically, however, the resilient flexible fingers 32 and 33 can deflect laterally inward to allow insertion through the opening 3. After passing through the opening, they deflect outward laterally to engage behind the edges of the opening 31 to the position illustrated in FIG. 5.

The upper part 6 which is schematically shown in FIG. 5 comprises in general a flat holding plate element 27 which can, for example, be connected to the outer plate element 2 in any convenient matter such as by gluing or welding. The upper part 6 also includes a tube-shaped section 28 with an aperture 12 having a counter profile 11 shaped and designed for resilient acceptance of the spherical segment 10 of middle piece 7. Preferably, and as shown in FIG. 5, the lower end of the tube-shaped segment 28 includes a continuous peripheral edge portion which is inclined at an angle for suitable engagement with the conically shaped portion 14 located beneath the head part 10. Additionally, this conically shaped or inclined portion on the tube-shaped section 28 is preferably somewhat rigid and reinforced by upwardly inclined segments.

Figure 7:
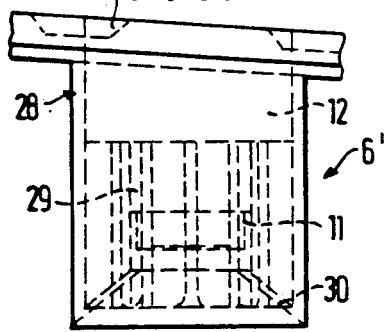

In FIG. 7, there is disclosed another version for the upper part 6. In this instance, the holding plate 27 runs, for example, at a slant or inclination relative to the longitudinal access of the tube shaped segment 28. In this embodiment, the aperture 12 in the tube-shaped section 28, is equipped with ribs 29 which extend along side the aperture 28. As can be appreciated, it is also possible that the holding plate 27 can be designed with a convex or concave shape to adapt it to corresponding outlines on the body panel plate element 2. In the formation of the upper part 6 according to FIG. 5, as well as according to FIG. 7, a conical insertion zone 30 is preferably positioned before the counter-profile 11 of the tube-shaped section 28. This facilitates insertion of the spherical segment 10 of the middle piece 7 into the upper part 6 or 6' respectively. Additionally, this functions to center the insertion in case of a transverse missmatch between the elements. That is, the incline or tapered mouth of the insertion zone 30 will cause the intermediate or middle piece 7 to shift laterally on the head 5 as the parts are brought together if there is some lateral misalignment between the upper part 6 and the lower holding element 4.

Since the spherical segment 10 of middle piece 7 is placed in the counter-profile 11 of the tube-shaped section 28 of upper part 6 or 6', respectively, there results a secure connection between the middle piece 7 and the upper piece 6 or 6'. As previously mentioned, and as shown by the direction of arrow I of FIG. 6, the lateral insertion of the head piece 5 of the holding element 4 into the pocket 17 of middle piece 7 in the lower region 9, produces a secure connection between the middle piece on one side and the holding element 4 on the other side. In spite of this secure connection, a lateral displacement between both parts in any transverse direction is possible. This is so because the head part 5 of holding element 4 is dimensioned smaller, as previously discussed, than the corresponding aperture 16 of pocket 17 of the middle piece 7.

Depending on the length of the tube-shaped section 28 of upper part 6, distance variations between support I and plate element 2 can be overcome or compensated for by means of the subject connection assembly. Thus, the relative distance between support 1 and plate element 2 can vary widely and a wide tolerance equalization or compensation is assured. Additionally, plate element 2 can, for example, extend in any fashion as suggested in FIG. 7 since plate 27 can be adapted to any corresponding outline or shape of the outer panel 2.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

It is now claimed:

1. In a connection assembly for providing a connection between a first structural support and an associated plate member comprising:
a first holding component molded of plastic and received in an aperture in the structural support, the holding component including an enlarged head portion spaced from the structural support;
a second component joined to the plate member at a location spaced outwardly from the first component; the improvement comprising: an intermediate component between the first and second components and including a laterally open pocket for resiliently receiving the head portion of the first holding component, the pocket having an internal size greater than the head portion to permit lateral shifting of the head portion in the pocket, and the second component including a tube-shaped portion extending toward the intermediate component with connection means for releasably joining the tube-shaped portion and the intermediate component.

2. A connection assembly according to claim 1 wherein said connection means includes a spherical body on one of said second or intermediate components and a resilient aperture on the other of said second or intermediate components for receiving said body.

3. A connection assembly according to claim 2 wherein the spherical body has a top surface formed by a plurality of conically tapering cross-pieces.

4. A connection assembly according to claim 2 wherein the spherical body has a bottom surface formed by a plurality of conically tapering cross-pieces.

5. A connection assembly according to claim 2 wherein the spherical body is formed by a plurality of cross-pieces of equal thickness.

6. A connection assembly according to claim 2 wherein the laterally open pocket has a resilient entrance section.

7. A connection assembly according to claim 6 wherein the enlarged head portion of the first holding component includes a reduced diameter neck portion and wherein the resilient entrance section on said pocket is narrower than said neck portion.

8. A connection assembly according to claim 7 wherein said pocket includes a recess opening which faces the first component and through which the neck portion extends, said recess opening being larger in its lateral dimensions than the lateral dimensions of said neck portion to permit lateral shifting of said intermediate component relative to said first component.

9. A connection assembly according to claim 1 wherein the second component includes a holding plate for connection to the plate member with the tube-shaped portion extending therefrom. said connection means including a resilient aperture in said tube-shaped portion.

10. A connection assembly according to claim 9 wherein said resilient aperture includes internal ribs.

11. A connection assembly as defined in claim 9 wherein said resilient aperture includes a conically shaped entrance.

12. A connection assembly as defined in claim 11 wherein the second component is joined to the plate member by being bonded thereto.

* * * * *